(12) United States Patent
Chen et al.

(10) Patent No.: US 9,073,122 B2
(45) Date of Patent: Jul. 7, 2015

(54) METHOD FOR PREPARING SILVER NANOWIRE

(71) Applicant: INDUSTRIAL TECHNOLOGY RESEARCH INSTITUTE, Chutung, Hsinchu (TW)

(72) Inventors: Lien-Tai Chen, Hsinchu (TW); Ruoh-Huey Uan, Zhudong Township (TW); Tsing-Tang Song, Toucheng Township (TW); Zhi-Long Chen, Chiayi (TW); Chun-Chen Chiang, New Taipei (TW); Ya-Hui Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 336 days.

(21) Appl. No.: 13/707,931

(22) Filed: Dec. 7, 2012

(65) Prior Publication Data
US 2013/0152737 A1    Jun. 20, 2013

(30) Foreign Application Priority Data
Dec. 19, 2011    (TW) .............................. 100147053 A

(51) Int. Cl.
*B22F 9/24* (2006.01)
*B22F 9/18* (2006.01)
(Continued)

(52) U.S. Cl.
CPC . *B22F 9/18* (2013.01); *B82Y 40/00* (2013.01); *B22F 1/0025* (2013.01); *B22F 9/24* (2013.01); *B22F 2301/255* (2013.01)

(58) Field of Classification Search
None
See application file for complete search history.

(56) References Cited

U.S. PATENT DOCUMENTS

| 7,585,349 B2 | 9/2009 | Xia et al. |
| 7,718,094 B2 | 5/2010 | Alexandridis et al. |

(Continued)

FOREIGN PATENT DOCUMENTS

| CN | 1740405 A | 3/2006 |
| CN | 1843670 A | 10/2006 |

(Continued)

OTHER PUBLICATIONS

Chang et al., "Evidence for the Growth Mechanisms of Silver Nanocubes and Nanowires," The Journal of Physical Chemistry, Apr. 4, 2011, vol. 115, pp. 7979-7986.

(Continued)

*Primary Examiner* — George Wyszomierski
(74) *Attorney, Agent, or Firm* — Birch, Stewart, Kolasch & Birch, LLP

(57) ABSTRACT

Disclosed is a method for preparing silver nanowire. The method includes: providing a first solution and a second solution; mixing the first solution and the second solution to obtain a third solution including a plurality of silver nanowires; and performing a purification procedure on the third solution to obtain the silver nanowires. Particularly, the first solution includes a capping agent dispersed in a first alcohol solvent, and the second solution includes a silver salt and a metal precursor dispersed in a second alcohol solvent, wherein the metal precursor has a formula:

$$MX_n \text{ or } MX_n \cdot m(H_2O)$$

wherein M is $Cu^{2+}$, $Sn^{4+}$, or $Ni^{2+}$, X is $Cl^-$, $Br^-$, $I^-$, $SCN^-$, $SO_4^{2-}$, $NO_3^-$, or $C_2O_4^{2-}$, n is 1-4, m is 1-6, and M has a valence equal to the absolute value of the product of n and a valence of X.

18 Claims, 3 Drawing Sheets

(51) Int. Cl.
B82Y 40/00 (2011.01)
B22F 1/00 (2006.01)

(56) References Cited

U.S. PATENT DOCUMENTS

| | | | |
|---|---|---|---|
| 7,922,787 | B2 | 4/2011 | Wang et al. |
| 2006/0068025 | A1 | 3/2006 | Chang et al. |
| 2008/0003130 | A1 | 1/2008 | Xia et al. |
| 2008/0210052 | A1 | 9/2008 | Allemand |
| 2009/0098405 | A1 | 4/2009 | Matsunami |
| 2009/0130433 | A1 | 5/2009 | Takada |
| 2009/0242231 | A1 | 10/2009 | Miyagisima et al. |
| 2009/0311530 | A1 | 12/2009 | Hirai et al. |
| 2010/0078197 | A1 | 4/2010 | Miyagishima et al. |
| 2010/0078602 | A1 | 4/2010 | Hosoya et al. |
| 2010/0148132 | A1* | 6/2010 | Jiang et al. ............ 252/514 |
| 2011/0048170 | A1 | 3/2011 | Bhatia et al. |
| 2011/0185852 | A1 | 8/2011 | Allemand |
| 2011/0185853 | A1 | 8/2011 | Wang et al. |
| 2012/0164469 | A1* | 6/2012 | Hsu et al. ............ 428/606 |
| 2013/0087363 | A1* | 4/2013 | Oh et al. ............ 174/126.1 |
| 2013/0192423 | A1* | 8/2013 | Yang et al. ............ 75/370 |
| 2014/0102254 | A1 | 4/2014 | Jiang et al. |

FOREIGN PATENT DOCUMENTS

| | | |
|---|---|---|
| CN | 201024002 A | 7/2010 |
| CN | 101934377 A | 1/2011 |
| CN | 101934378 A | 1/2011 |
| CN | 102161102 A | 8/2011 |
| CN | 102259190 A | 11/2011 |
| TW | 201022451 A1 | 6/2010 |
| WO | WO 2007/001453 A2 | 1/2007 |

OTHER PUBLICATIONS

Chen et al., "Large-scale synthesis of silver nanowires via a solvothermal method," Journal of Materials Science: Materials in Electronics, Jan. 2011, vol. 22, pp. 6-13.

Chen et al., "Morphology-controlled synthesis of silver nanostructures via a seed catalysis process," Nanotechnology, 2007, vol. 18, pp. 1-8.

Chen et al., "Study on the synthesis of silver nanowires with adjustable diameters through the polyol process," Nanotechnology, 2006, vol. 17, pp. 3933-3938.

Chen et al., "The influence of seeding conditions and shielding gas atmosphere on the synthesis of silver nanowires through the polyol process," Nanotechnology, 2006, vol. 17, pp. 466-474.

Gu et al., "Synthesis of silver nanorods and nanowires by tartrate-reduced route in aqueous solutions," Materials Chemistry and Physics, 2006, vol. 96, pp. 217-222.

Korte et al., "Rapid synthesis of silver nanowires through a CuCl- or CuCl2-mediated polyol process," Journal of Materials Chemistry, 2008, vol. 18, pp. 437-441.

Luu et al., "Preparation and optical properties of silver nanowires and silver-nanowire thin films," Journal of Colloid and Interface Science, Apr. 2011, vol. 356, pp. 151-158.

Skrabalak et al., "On the Polyol Synthesis of Silver Nanostructures: Glycolaldehyde as a Reducing Agent," Nano Letters, 2008, vol. 8, No. 7, pp. 2077-2081.

Sun et al., "Crystalline Silver Nanowires by Soft Solution Processing," Nano Letters, 2002, vol. 2, No. 2, pp. 165-168.

Sun et al., "Polyol Synthesis of Uniform Silver Nanowires: A Plausible Growth Mechanism and the Supporting Evidence," Nano Letters, 2003, vol. 3, No. 7, pp. 955-960.

Sun et al., "Uniform Silver Nanowires Synthesis by Reducing AgNO3 with Ethylene Glycol in the Presence of Seeds and Poly(Vinyl Pyrrolidone)," Chem. Mater., 2002, vol. 14, pp. 4736-4745.

Tang et al., "Syntheses of Silver Nanowires in Liquid Phase," Nanowires Science and Technology, 2010, pp. 25-42.

Tsuji et al., "Roles of Pt seeds and chloride anions in the preparation of silver nanorods and nanowires by microwave-polyol method," Colloids and Surfaces A: Physicochemical and Engineering Aspects, 2008, vol. 316, pp. 266-277.

Wang et al., "A Simple Hydrothermal Route to Large-Scale Synthesis of Uniform Silver Nanowires," Chemistry—A European Journal, 2005, vol. 11, pp. 160-163.

Wang et al., "Solvothermal Synthesis and Characterization of Silver Nanowires," 2009, vol. 5, pp. 159-163.

Wiley et al., "Polyol Synthesis of Silver Nanoparticles: Use of Chloride and Oxygen to Promote the Formation of Single-Crystal, Truncated Cubes and Tetrahedrons," Nano Letters, 2004, vol. 4, No. 9, pp. 1733-1739.

Wiley et al., "Polyol Synthesis of Silver Nanostructures: Control of Product Morphology with Fe(II) or Fe(III) Species," Langmuir, 2005, vol. 21, No. 18, pp. 8077-8080.

Zhang et al., "Self-organized formation of silver nanowires, nanocubes and bipyramids via a solvothermal method," Acta Materialia, 2008, vol. 56, pp. 2508-2513.

Zhao et al., "Microwave-controlled ultrafast synthesis of uniform silver nanocubes and nanowires," Chemical Physics Letters, Jan. 2011, vol. 501, pp. 414-418.

Chinese Office Action dated Jul. 23, 2014 for Chinese Application No. 201210108083.7.

Taiwanese Office Action, dated May 13, 2014, for Taiwanese Application No. 100147053.

* cited by examiner

METHOD FOR PREPARING SILVER NANOWIRE

CROSS REFERENCE TO RELATED APPLICATIONS

This application is based upon and claims the benefit of priority from the prior Taiwan Patent Application No. 100147053, filed on Dec. 19, 2011, the entire contents of which are incorporated herein by reference.

TECHNICAL FIELD

The disclosure relates to a method for preparing silver nanowire.

BACKGROUND

One-dimensional nanostructures, such as nanowires, nanotubes, nanorods, or nanofibers, have different physical and electrical characteristics from macro-materials. For example, one-dimensional metal nanostructures, such as gold, tin, silver, or platinum nanowire, have good electrical conductivity and so are applied as materials in leading wires. Because micro-effects such as the surface effect, quantum effect, and tunneling effect become obvious at the nanoscale, one-dimensional metal nanostructures are suitable for various electrical nanodevices utilizing micro-effects. Furthermore, one-dimensional metal nanostructures are suitable for use in electrodes, low-temperature conductive paste, superconducting thick-film circuits, and materials for absorbing microwaves and electromagnetic waves. Silver is a particularly optimum metal conductive material, therefore, the applications for silver nanowires are considered important issues.

SUMMARY

One embodiment of the disclosure provides a method for preparing silver nanowire, including providing a first solution, wherein the first solution comprises a capping agent dispersing in a first alcohol solvent; providing a second solution, wherein the second solution comprises a silver salt and a metal precursor dispersing in a second alcohol solvent; mixing the first solution and the second solution, obtaining a third solution having a plurality of silver nanowires; and performing a purification to the third solution, obtaining the silver nanowires. Particularly, the metal precursor has a formula:

$$MX_n \text{ or } MX_n \cdot m(H_2O)$$

wherein, M is $Cu^{2+}$, $Sn^{4+}$, or $Ni^{2+}$, X is $Cl^-$, $Br^-$, $I^-$, $SCN^-$, $SO_4^{2-}$, $NO_3^-$, or $C_2O_4^{2-}$, n is 1-4, m is 1-6, and M has a valence equal to the absolute value of the product of n and a valence of X.

A detailed description is given in the following embodiments with reference to the accompanying drawings.

DRAWINGS

The disclosure can be more fully understood by reading the subsequent detailed description and examples with references made to the accompanying drawings, wherein.

DETAILED DESCRIPTION

Figure 1:
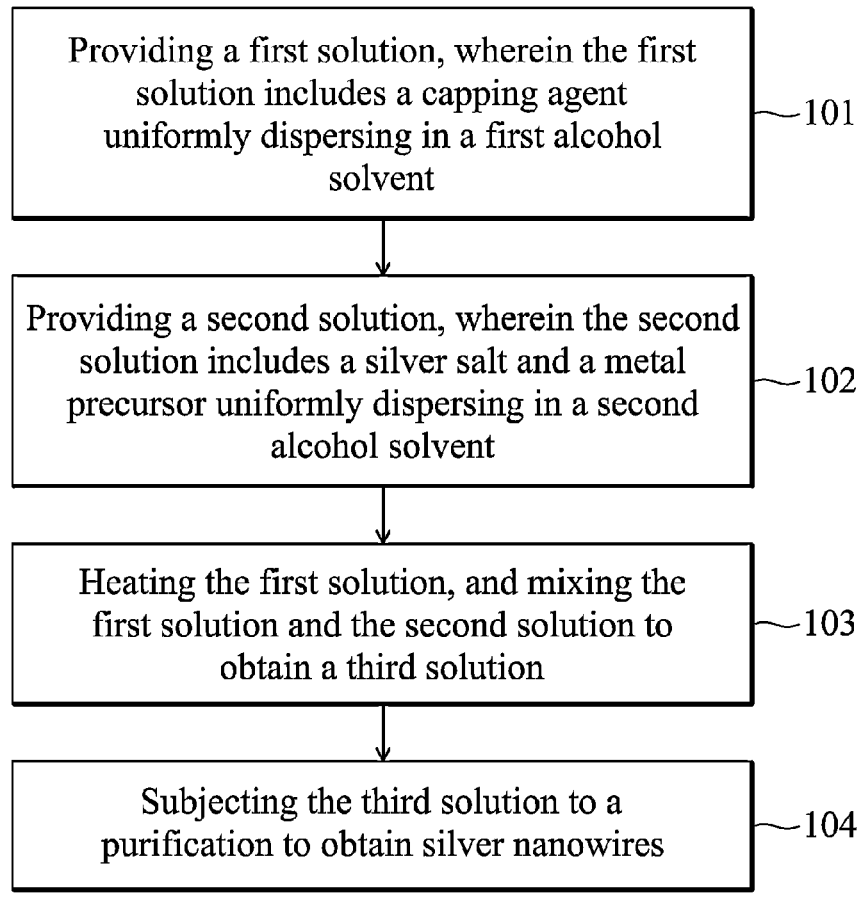
FIG. 1 is a flow chart illustrating a method for preparing silver nanowire according to an embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

According to an embodiment of the disclosure, the method for preparing silver nanowire can includes the following steps, a shown in FIG. 1.

First, a first solution is provided, wherein the first solution includes a capping agent uniformly dispersed in a first alcohol solvent (step 101). The capping agent can include a polymer (with a molecular weight between 40000 and 360000), such as polyvinyl alcohol (PVA), polyvinyl pyrrolidone (PVP), polyethylene glycol (PEG), polydimethyl siloxane (PDMS), or Polyvinyl butyral (PVB), wherein the polymer is apt to be dissolved into a polar solvent. After subsequently mixing with a silver salt, the capping agent would preferentially interact and adhere to a lateral surface of a growth nanowire, such that the capping agent confines the lateral surface from growing and encourages a cross section surface of the nanowire to crystallize. The first alcohol solvent can have at least two hydroxyl groups. For example, the first alcohol solvent can be ethylene glycol, glycerol, glucose, diethylene glycol, tri-ethylene glycol, propylene glycol, butanediol, or dipropylene glycol.

Next, a second solution is provided, wherein the second solution includes a silver salt and a metal precursor uniformly dispersed in a second alcohol solvent (step 102). The silver salt, for example, can include $AgNO_3$, or $AgCF_3COO$; the metal precursor, for example, can have a chemical structure represented by $MX_n$ or $MX_n \cdot m(H_2O)$, wherein M is $Cu^{2+}$, $Sn^{4+}$, or $Ni^{2+}$, X is $Cl^-$, $SCN^-$, $SO_4^{2-}$, $NO_3^-$, or $C_2O_4^{2-}$, n is 1-4, m is 1-6, and M has a valence equal to the absolute value of the product of n and a valence of X. M (metal ion) of the metal precursor can have an absolute value of reduction potential between 0.1 and 0.7. The metal precursor, for example, can be $SnCl_4$, $SnI_4$, $SnSCN_4$, $CuCl_2$, $CuI_2$, $CuSCN_2$, $CuSO_4$, $NiCl_2$, $NiI_2$, $NiSCN_2$, $NiSO_4$, $Cu(NO_3)_2$ or a hydrate of the aforementioned compound. The second alcohol solvent can have at least two hydroxyl groups, and the first and second alcohol solvents can be the same or different. The second alcohol solvent, for example, can be ethylene glycol, glycerol, glucose, diethylene glycol, tri-ethylene glycol, propylene glycol, butanediol, or dipropylene glycol. In the preparation of the second solution, the silver salt can react with the metal precursor to form a silver-containing complex, wherein the silver-containing complex has a solubility product constant (Ksp) of between $10^{-5}$ and $10^{-18}$. For example, the silver-containing complex can be AgCl (with a Ksp of $1.77 \times 10^{-10}$), AgBr (with a Ksp of $5.35 \times 10^{-13}$), AgI (with a Ksp of $8.512 \times 10^{-17}$), AgSCN (with a Ksp of $1.03 \times 10^{-12}$), AgSO$_4$ (with a Ksp of $1.2 \times 10^{-5}$), or AgC$_2$O$_4$ (with a Ksp of $5.04 \times 10^{-12}$).

According to another embodiment of the disclosure, the molar ratio of the silver salt and the metal precursor can be from 1:0.0001 to 1:0.1 or from 1:0.001 to 1:0.05, in order to force the silver complex to stably chemically reduce to silver and form a silver nanowire along the <100> crystal orientation. It should be noted that, in order to increase the precipitation rate of the silver nanowire, the second solution can further comprise an alkali metal salt, such as NaCl, NaSCN, KI, Na$_2$(C$_2$O$_4$) or KBr. Particularly, the molar ratio of the alkali metal salt and the metal precursor can be from 0.1:1 to 5:1 or from 1:1 to 4:1. Next, the first solution is mixed with the second solution to obtain a third solution with a plurality of silver nanowire. In order to increase the precipitation rate of the silver nanowire, the first solution can be heated to a specific temperature before mixing with the second solution (step 103), wherein the specific temperature can be between 100° C. and 180° C. If the first solution is heated to a temperature higher than 180° C., the chemical reduction of silver is hard to control. It is possible that the main product produced by reacting the first solution with the second solution would be silver grains (rather than silver nanowires), if the first solution mixed with the second solution without heating the first solution first. According to an embodiment of the disclosure, the temperature of the third solution can be kept between 100° C. and 180° C. Further, the ratio of the volume of the first solution to the second solution can be from 1:1 to 3:1. In order to facilitate mixing the first solution and second solution, stirring equipment (such as a homogenizer, magnetic mixer, or gear-motor mixer) can be used for completely mixing the first solution and the second solution. Due to the specific metal precursor, the method for preparing silver nanowires of the disclosure has a lower cost in comparison with the conventional method, and the precipitation rate of the silver nanowire can be increased resulting in a lot of silver nanowires being produced in the third solution after 5-60 min (or 5-51 min) of mixing the first and second solutions. According to an embodiment of the disclosure, the molar ratio of the capping agent of the first solution to the metal precursor of the second solution can be from 0.5:1 to 1.5:1 (or from 0.9:1 to 1.5:1), in order to increase the silver nanowire weight percentage of the crude product of more than 70wt % (i.e. the weight ratio of the silver nanowire to the crude product is greater than 0.7). Furthermore, the aspect ratio of the silver nanowire can be of more than 50. Finally, after the formation of the nanowires, the third solution is subjected to purification, obtaining the silver nanowire (step 104). The purification process includes centrifuging the third solution, and washing the precipitate with deionized water.

According to some embodiments, the first solution can include polyvinyl pyrrolidone (serving as a capping agent) uniformly dispersed in ethylene glycol; and the second solution can include a silver salt and a nickel-containing compound uniformly dispersed in ethylene glycol, wherein the nickel-containing compound can include NiCl$_2$, NiI$_2$, NiSCN$_2$, NiSO$_4$, or a hydrate of the aforementioned compound. The second solution can further include an alkali metal salt, such as NaCl, NaSCN, KI, Na$_2$(C$_2$O$_4$) or KBr. The molar ratio of the silver salt to the nickel-containing compound can be from 1:0.0003 to 1:0.0005, and the molar ratio of the capping agent to the silver salt can be from 0.5:1 to 1.5:1. Herein, Ag atoms would be replaced with Ni atoms via a replacement reaction, thereby promoting the nucleation of silver. The second solution can further include an alkali metal salt (providing anions) for accelerating the formation of nanowires. The conventional method for preparing silver nanowires generally employs a platinum-containing compound, due to the positive reduction potential (+0.73) of Pt$^{2+}$ ion. Since Ni$^{2+}$ ion has a reduction potential of −0.25, there is no reference describing the use of a nickel-containing compound serving as a metal precursor for accelerating the formation of nanowires. The disclosure is believed to comprise the first discovery that a nickel-containing compound can serve as metal precursor for accelerating the formation of silver nanowires.

According to another embodiment, the first solution can include polyvinyl pyrrolidone (serving as a capping agent) uniformly dispersed in ethylene glycol; and the second solution can include a silver salt and copper chloride (CuCl$_2$) uniformly dispersed in ethylene glycol, wherein the molar ratio of the silver salt to copper chloride can be from 1:0.0008 to 1:0.001, and the molar ratio of the capping agent to the silver salt can be from 0.9:1 to 1.2:1. Accordingly, after less than 20 min of mixing the first and second solutions, the precipitation of silver nanowires in the third solution is observed, and the silver nanowire would have a weight percentage of more than 70wt % (based on the weight of the crude product).

The following examples are intended to illustrate the disclosure more fully without limiting the scope of the disclosure, since numerous modifications and variations will be apparent to those skilled in this art.

Preparation of Silver Nanowire

EXAMPLE 1

First, 150 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, 0.0003 mole of NiCl$_2$.6(H$_2$O), and 50 ml of ethylene glycol were added to a reaction bottle. After stirring, a second solution was obtained. Next, the first solution was heated to 150° C., and the second solution was subsequently mixed with the first solution, obtaining a third solution (the molar ratio of silver nitrate to NiCl$_2$.6(H$_2$O) was 1:0.03, and the molar ratio of PVP to silver nitrate was 1:1).

Figure 2:
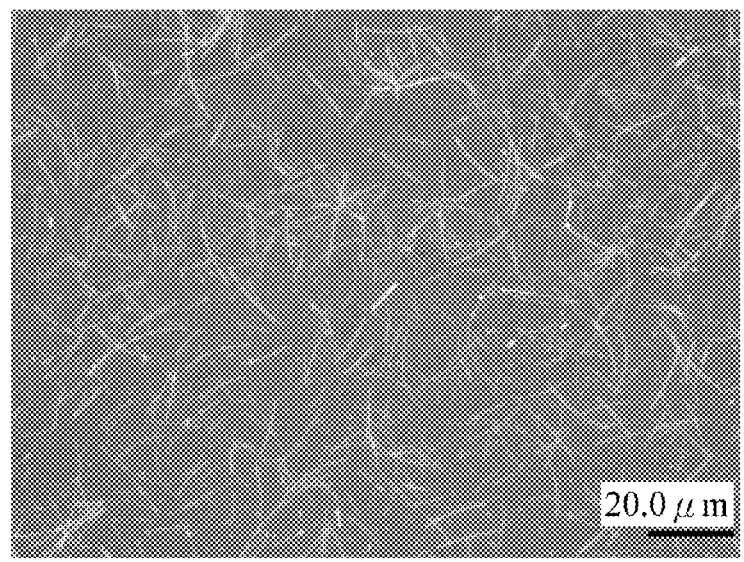
FIG. 2 is a scanning electron microscope (SEM) photograph of the silver nanowires in Example 1 (after a reaction time of 17 min).
Figure 3:
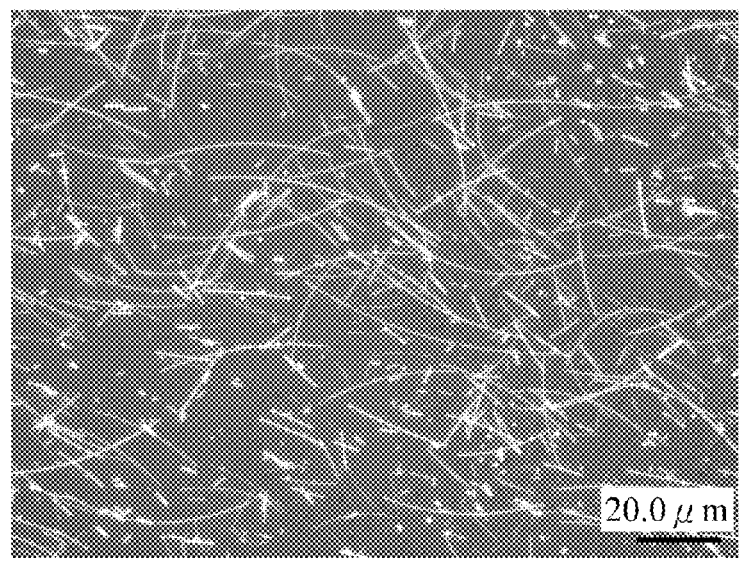
FIG. 3 is a scanning electron microscope (SEM) photograph of the silver nanowires in Example 1 (after a reaction time of 23 min).

The third solution was examined with a scanning electron microscope (SEM) after reacting for 17 and 23 min, and the results are shown in FIGS. 2 and 3, and the measurements of silver nanowires are shown in Table 1. Finally, the third solution was centrifuged, and then the precipitate was washed with deionized water, obtaining silver nanowires with an average aspect ratio of 150.

TABLE 1

| | silver nitrate (mole) | NiCl$_2$•6(H$_2$O) (mole) | reaction temperature (° C.) | reaction time (min) | length of silver nanowire (μm) |
|---|---|---|---|---|---|
| Example 1 | 0.01 | 0.0003 | 150 | 17 | 2-31 |
| | | | | 23 | 2-62 |

As shown in Table 1, in the method for preparing silver nanowires disclosed in Example 1. The formation of silver nanowires was observed after reacting for 17 min. Further, the silver nanowires with increasing length were observed after reacting for 23 min.

EXAMPLE 2

First, 100 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, $6\times10^{-5}$ mole of $NiSO_4$, and 50 ml of ethylene glycol were added to a reaction bottle. After stirring, a second solution was obtained. Next, the first solution was heated to 150° C., and the second solution was subsequently mixed with the first solution, obtaining a third solution (the molar ratio of silver nitrate to $NiSO_4$ was 1:0.006, and the molar ratio of PVP to silver nitrate was 1:1).

The third solution was continuously examined using a scanning electron microscope (SEM). After reacting for 51 min, the formation of the silver nanowire was completed. Finally, the third solution was centrifuged, and then the precipitate was washed with deionized water, obtaining silver nanowires. The measurement of the silver nanowires is shown in Table 2.

EXAMPLE 3

First, 100 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, 0.0003 mole of $NiSO_4$, 0.001 mole of $Na_2(C_2O_4)$, and 50 ml of ethylene glycol were added to a reaction bottle. After stirring, a second solution was obtained. Next, the first solution was heated to 160° C., and the second solution was subsequently mixed with the first solution, obtaining a third solution.

The third solution was continuously examined using a scanning electron microscope (SEM). After reacting for 11 min, the formation of the silver nanowire was completed. Finally, the third solution was centrifuged, and then the precipitate was washed with deionized water, obtaining silver nanowires. The measurement of the silver nanowires is shown in Table 2.

EXAMPLE 4

First, 100 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, 0.0003 mole of $NiSO_4$, 0.001 mole of KBr, and 50 ml of ethylene glycol were added to a reaction bottle. After stirring, a second solution was obtained. Next, the first solution was heated to 160° C., and the second solution was subsequently mixed with the first solution, obtaining a third solution.

The third solution was continuously examined with a scanning electron microscope (SEM). After reacting for 22 min, the formation of the silver nanowire was completed. Finally, the third solution was centrifuged, and then the precipitate was washed with deionized water, obtaining silver nanowires. The measurement of the silver nanowires is shown in Table 2.

TABLE 2

|  | silver nitrate (mole) | $NiSO_4$ (mole) | alkali metal salt (mole) | reaction temperature (° C.) | reaction time (min) | length of silver nanowire (μm) |
| --- | --- | --- | --- | --- | --- | --- |
| Example 2 | 0.01 | 0.0003 | — | 150 | 51 | 5-25 |
| Example 3 | 0.01 | 0.0003 | 0.001 $Na_2(C_2O_4)$ | 160 | 11 | 1-10 |
| Example 4 | 0.01 | 0.0003 | 0.001 KBr | 160 | 22 | 4-20 |

EXAMPLE 5

First, 150 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, 0.0005 mole of $NiSO_4.6(H_2O)$, 0.0005 mole of NaCl, and 50 ml of ethylene glycol were added to a reaction bottle. After stirring, a second solution was obtained. Next, the first solution was heated to 150° C., and the second solution was subsequently mixed with the first solution, obtaining a third solution.

The third solution was continuously examined using a scanning electron microscope (SEM). After reacting for 25 min, the formation of the silver nanowire was completed. Finally, the third solution was centrifuged, and then the precipitate was washed in deionized water, obtaining silver nanowires. The measurement of the silver nanowires is shown in Table 3.

EXAMPLE 6

First, 100 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, 0.0005 mole of $NiSO_4.6(H_2O)$, 0.001 mole of NaCl, and 50 ml of ethylene glycol were added to a reaction bottle. After stirring, a second solution was obtained. Next, the first solution was heated to 150° C., and the second solution was subsequently mixed with the first solution, obtaining a third solution.

The third solution was continuously examined using a scanning electron microscope (SEM). After reacting for 36 min, the formation of the silver nanowire was completed. Finally, the third solution was centrifuged, and then the precipitate was washed in deionized water, obtaining silver nanowires. The measurement of the silver nanowires is shown in Table 3.

EXAMPLE 7

First, 100 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, 0.0003 mole of $NiSO_4.6(H_2O)$, 0.001 mole of NaCl, and 50 ml of ethylene glycol were added to a reaction bottle. After stirring, a second solution was obtained. Next, the first solution was heated to 160° C., and the second solution was subsequently mixed with the first solution, obtaining a third solution.

The third solution was continuously examined with a scanning electron microscope (SEM). After reacting for 32 min, the formation of the silver nanowire was completed. Finally, the third solution was centrifuged, and then the precipitate was washed with deionized water, obtaining silver nanowires. The measurement of the silver nanowires is shown in Table 3.

EXAMPLE 8

First, 100 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, 0.0003 mole of $NiSO_4.6(H_2O)$, 0.001 mole of NaSCN, and 50 ml of ethylene glycol were added to a reaction bottle. After stirring, a second solution was obtained. Next, the first solution was heated to 160° C., and the second solution was subsequently mixed with the first solution, obtaining a third solution.

The third solution was continuously examined using a scanning electron microscope (SEM). After reacting for 32 min, the formation of the silver nanowire was completed. Finally, the third solution was centrifuged, and then the precipitate was washed with deionized water, obtaining silver nanowires. The measurement of the silver nanowires is shown in Table 3.

EXAMPLE 9

First, 100 ml of ethylene glycol and 0.01 mole of polyvinyl pyrrolidone (with a molecular weight of 360000) serving as a capping agent were added in a reaction bottle. After stirring, polyvinyl pyrrolidone was uniformly dispersed in ethylene glycol, obtaining a first solution. Next, 0.01 mole of silver nitrate, 0.0003 mole of $NiSO_4.6(H_2O)$, 0.0003 mole of KI, and 50 ml of ethylene glycol were added to a reaction bottle. After stirring, a second solution was obtained. Next, the first solution was heated to 160° C., and the second solution was subsequently mixed with the first solution, obtaining a third solution.

The third solution was continuously examined with a scanning electron microscope (SEM). After reacting for 15 min, the formation of the silver nanowire was completed. Finally, the third solution was centrifuged, and then the precipitate was washed in deionized water, obtaining silver nanowires. The measurement of the silver nanowires is shown in Table 3.

COMPARATIVE EXAMPLE 1

First, 100 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, 0.0003 mole of KI, and 50 ml of ethylene glycol were added to a reaction bottle. After stirring, a second solution was obtained. Next, the first solution was heated to 150° C., and the second solution was subsequently mixed with the first solution, obtaining a third solution.

The third solution was examined using a scanning electron microscope (SEM) after reacting for 41 mins and 50 mins to confirm weather silver nanowires was produced. The results are shown in Table 3.

TABLE 3

| | silver nitrate (mole) | $NiSO_4 \cdot 6(H_2O)$ (mole) | alkali metal salt (mole) | reaction temperature (° C.) | reaction time (min) | length of silver nanowire(μm) |
|---|---|---|---|---|---|---|
| Example 5 | 0.01 | 0.0005 | 0.0005 NaCl | 150 | 25 | 2-15 |
| Example 6 | 0.01 | 0.0005 | 0.001 NaCl | 150 | 36 | 5-36 |
| Example 7 | 0.01 | 0.0003 | 0.001 NaCl | 160 | 17 | 2-45 |
| Example 8 | 0.01 | 0.0003 | 0.001 NaSCN | 160 | 32 | 3-36 |
| Example 9 | 0.01 | 0.0003 | 0.0003 KI | 160 | 15 | 4-11 |
| Comparative Example 1 | 0.01 | — | 0.0003 KI | 150 | 41 | No silver nanowire was observed |
| | | | | | 50 | No silver nanowire was observed |

EXAMPLE 10

First, 150 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, 0.0001 mole of $SnCl_4.5(H_2O)$, and 50 ml of ethylene glycol were added to a reaction bottle. After stirring, a second solution was obtained. Next, the first solution was heated to 150° C., and the second solution was subsequently mixed with the first solution, obtaining a third solution.

The third solution was examined with a scanning electron microscope (SEM) after reacting for 28 and 25 min, and the measurements of silver nanowires are shown in Table 4. Finally, the third solution was centrifuged, and then the precipitate was washed with deionized water, obtaining silver nanowires.

TABLE 4

|  | silver nitrate (mole) | $SnCl_4 \cdot 5(H_2O)$ (mole) | reaction temperature (° C.) | reaction time (min) | length of silver nanowire (μm) |
|---|---|---|---|---|---|
| Example 10 | 0.01 | 0.0001 | 150 | 28 | 4-40 |
|  |  |  |  | 35 | 6-45 |

EXAMPLE 11

First, 100 ml of ethylene glycol and 0.0138 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, $1 \times 10^{-5}$ mole of $CuSO_4$, and 100 ml of ethylene glycol were added to a reaction bottle. After stirring, a second solution was obtained. Next, the first solution was heated to 150° C., and the second solution was subsequently mixed with the first solution, obtaining a third solution.

The third solution was continuously examined with a scanning electron microscope (SEM). After reacting for 25 min, the formation of the silver nanowire was completed. Finally, the third solution was centrifuged, and then the precipitate was washed in deionized water, obtaining silver nanowires. The measurement of the silver nanowires is shown in Table 5.

EXAMPLE 12

First, 100 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, $1 \times 10^{-5}$ mole of $CuSO_4$, $2 \times 10^{-5}$ mole of NaCl, and 100 ml of ethylene glycol were added to a reaction bottle. After stirring, a second solution was obtained. Next, the first solution was heated to 150° C., and the second solution was subsequently mixed with the first solution, obtaining a third solution.

The third solution was continuously examined through a scanning electron microscope (SEM). After reacting for 17 min, the formation of the silver nanowire was completed. Finally, the third solution was centrifuged, and then the precipitate was washed using deionized water, obtaining silver nanowires. The measurement of the silver nanowires is shown in Table 5.

TABLE 5

|  | silver nitrate (mole) | $CuSO_4$ (mole) | alkali metal salt (mole) | reaction temperature (° C.) | reaction time (min) | length of silver nanowire (μm) |
|---|---|---|---|---|---|---|
| Example 11 | 0.01 | $1 \times 10^{-5}$ | — | 150 | 25 | 3-35 |
| Example 12 | 0.01 | $1 \times 10^{-5}$ | NaCl $2 \times 10^{-5}$ | 150 | 17 | 3-35 |

Figure 5:
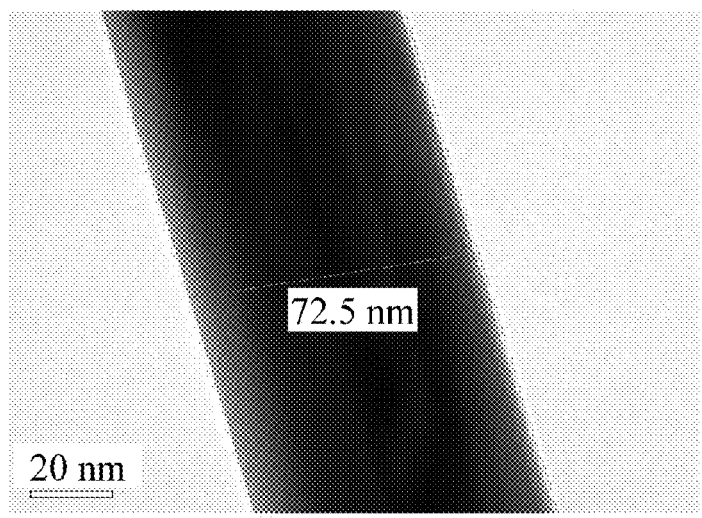
FIG. 5 is a scanning electron microscope (SEM) photograph of the silver nanowires in Example 15.

As shown in FIG. 5, with the addition of NaCl and $CuSO_4$ in the second solution (Example 12), the reaction time for forming silver nanowire is shorted from 25 min to 17 min in comparison with Example 11.

EXAMPLE 13

First, 100 ml of ethylene glycol and 0.01 mole of polyvinyl pyrrolidone (with a molecular weight of 58000) serving as a capping agent were added to a reaction bottle. After stirring, polyvinyl pyrrolidone was uniformly dispersed in ethylene glycol, obtaining a first solution. Next, 0.01 mole of silver nitrate, $1 \times 10^{-5}$ mole of $CuCl_2$, and 100 ml of ethylene glycol were added to a reaction bottle. After stirring, a second solution was obtained. Next, the first solution was heated to 150° C., and the second solution was subsequently mixed with the first solution, obtaining a third solution.

The third solution was continuously examined using a scanning electron microscope (SEM). After reacting for 17 min, the formation of the silver nanowire was completed. Finally, the third solution was centrifuged, and then the precipitate was washed in deionized water, obtaining silver nanowires. The measurement of the silver nanowires is shown in Table 6.

COMPARATIVE EXAMPLE 2

First, 100 ml of ethylene glycol and $5.5 \times 10^{-3}$ mole of polyvinyl pyrrolidone (with a molecular weight of 58000) serving as a capping agent were added to a reaction bottle. After stirring, polyvinyl pyrrolidone was uniformly dispersed in ethylene glycol, obtaining a first solution. Next, $3.5 \times 10^{-3}$ mole of silver nitrate, $3.8 \times 10^{-6}$ mole of $CuCl_2$, and 100 ml of ethylene glycol were added to a reaction bottle. After stirring, a second solution was obtained. Next, the first solution was heated to 150° C., and the second solution was subsequently mixed with the first solution, obtaining a third solution (the molar ratio of the $CuCl_2$ to silver nitrate was 0.0011, and the molar ratio of PVP to silver nitrate was 1.56).

The third solution was continuously examined using a scanning electron microscope (SEM). After reacting for 17 min, there was no silver nanowire observed. After reacting for 60 min, silver nanowires were observed in the third solution. The measurement of the silver nanowires is shown in Table 6.

TABLE 6

|  | molar ratio of PVP to silver nitrate | molar ratio of $CuCl_2$ to silver nitrate | reaction temperature (° C.) | reaction time (min) | Formation of silver nanowire |
|---|---|---|---|---|---|
| Example 13 | 1.00 | 0.001 | 150 | 17 | Yes |
| Comparative Example 2 | 1.56 | 0.0011 | 150 | 17 | No |
|  |  |  |  | 60 | Yes |

As shown in Table 6, if the molar ratio of PVP to silver nitrate is greater than 1.5 and/or the molar ratio of copper chloride to silver nitrate is greater than 0.001, the reaction time for forming silver nanowire is increased to 60 min.

EXAMPLE 14

First, 100 ml of ethylene glycol and 0.01 mole of polyvinyl pyrrolidone (with a molecular weight of 40000) serving as a capping agent were added to a reaction bottle. After stirring, polyvinyl pyrrolidone was uniformly dispersed in ethylene glycol, obtaining a first solution. Next, 0.01 mole of silver nitrate, $1 \times 10^{-5}$ mole of $CuCl_2$, and 100 ml of ethylene glycol were added to a reaction bottle. After stirring, a second solution was obtained. Next, the first solution was heated to 150° C., and the second solution was subsequently mixed with the first solution, obtaining a third solution.

Figure 4:
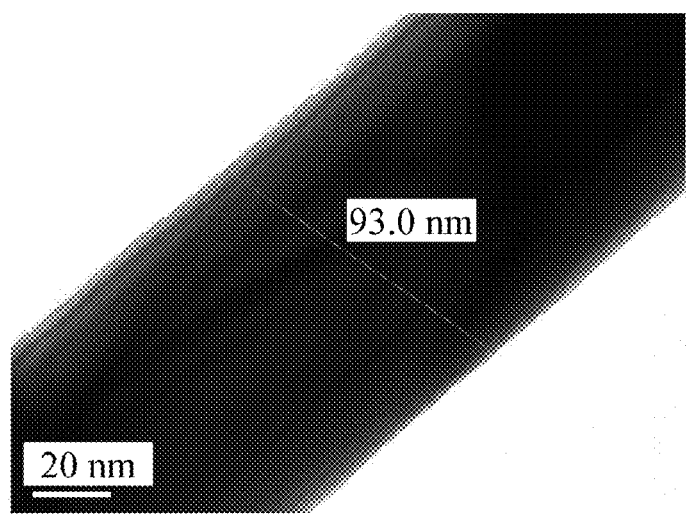
FIG. 4 is a scanning electron microscope (SEM) photograph of the silver nanowires in Example 14.

The third solution was continuously examined using a scanning electron microscope (SEM). After reacting for 17 min, the formation of the silver nanowire was completed. Finally, the third solution was centrifuged, and then the precipitate was washed using deionized water, obtaining silver nanowires with an aspect ratio of 114, an average length of 10.8 μm, and an average diameter of 94.7 nm. The scanning electron microscope (SEM) photograph of the silver nanowires is shown in FIG. 4

EXAMPLE 15

First, 100 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, $1\times10^{-5}$ mole of $CuCl_2$, and 100 ml of ethylene glycol were added to a reaction bottle. After stirring, a second solution was obtained. Next, the first solution was heated to 150° C., and the second solution was subsequently mixed with the first solution, obtaining a third solution.

The third solution was continuously examined with a scanning electron microscope (SEM). After reacting for 17 min, the formation of the silver nanowire was completed. Finally, the third solution was centrifuged, and then the precipitate was washed in deionized water, obtaining silver nanowires with an aspect ratio of 220, an average length of 15.6 μm, and an average diameter of 70.8 nm. The scanning electron microscope (SEM) photograph of the silver nanowires is shown in FIG. 5.

EXAMPLE 16

First, 100 ml of ethylene glycol and 0.01 mole of polyvinyl pyrrolidone (with a molecular weight of 360000) serving as a capping agent were added to a reaction bottle. After stirring, polyvinyl pyrrolidone was uniformly dispersed in ethylene glycol, obtaining a first solution. Next, 0.01 mole of silver nitrate, $8\times10^{-6}$ mole of $CuCl_2$, and 100 ml of ethylene glycol were added to a reaction bottle. After stirring, a second solution was obtained. Next, the first solution was heated to 150° C., and the second solution was subsequently mixed with the first solution, obtaining a third solution (the molar ratio of the $CuCl_2$ to silver nitrate was 0.0008, and the molar ratio of PVP to silver nitrate was 1).

The third solution was continuously examined with a scanning electron microscope (SEM). After reacting for 17 min, the formation of the silver nanowire was completed. Finally, the third solution was centrifuged, and then the precipitate was washed with deionized water, obtaining silver nanowires with an aspect ratio of 286, an average length of 16 μm, and an average diameter of 56 nm.

EXAMPLE 17

First, 100 ml of ethylene glycol and 0.01 mole of polyvinyl pyrrolidone (with a molecular weight of 40000) serving as a capping agent were added to a reaction bottle. After stirring, polyvinyl pyrrolidone was uniformly dispersed in ethylene glycol, obtaining a first solution. Next, 0.01 mole of silver nitrate, 8×10-6 mole of $CuCl_2$, and 100 ml of ethylene glycol were added to a reaction bottle. After stirring, a second solution was obtained. Next, the first solution was heated to 150° C., and the second solution was subsequently mixed with the first solution, obtaining a third solution (the molar ratio of the $CuCl_2$ to silver nitrate was 0.0008, and the molar ratio of PVP to silver nitrate was 1).

The third solution was continuously examined using a scanning electron microscope (SEM). After reacting for 17 min, the formation of the silver nanowire was completed. Finally, the third solution was centrifuged, and then the precipitate was washed with deionized water, obtaining silver nanowires with an aspect ratio of 88, an average length of 8.2 μm, and an average diameter of 93 nm. According to the examples given above, the molar ratio of silver nitrate and metal precursor was 1:0.006 to 1:1:0.05.

TW Patent Application No. 97146836 discloses a method for preparing silver nanowires with polyvinyl pyrrolidone serving as a capping agent, and teaches "the average diameter and length of silver nanowire are in direct ratio to the molecular weight of polyvinyl pyrrolidone". As shown in FIGS. 4 and 5, since copper chloride (serving as a metal precursor) is used for preparing silver nanowires in embodiments of the disclosure, the average diameter of silver nanowire is in inverse ratio to the molecular weight of polyvinyl pyrrolidone (i.e. the aspect ratio of silver nanowire is in direct ratio to the molecular weight of polyvinyl pyrrolidone). The above result of the disclosure teaches otherwise from TW Patent Application No. 97146836.

Accordingly, by means of the method for preparing the silver nanowire of the disclosure, the silver nanowire weight percentage of the crude product can be of more than 70wt % (i.e. the weight ratio of the silver nanowire to the crude product is greater than 0.7), and the obtained silver nanowire have an aspect ratio of more than 50 and an average diameter of less than 100 nm. Further, the reaction time for preparing silver nanowires can be also reduced.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A method for preparing silver nanowire, comprising:
providing a first solution, wherein the first solution comprises a capping agent dispersed in a first alcohol solvent;
providing a second solution, wherein the second solution comprises a silver salt and a metal precursor dispersed in a second alcohol solvent, wherein the molar ratio of the capping agent to the silver salt is from 0.5:1 to 1.5:1, wherein the metal precursor has a formula:

$MX_n$ or $MX_n \cdot m(H_2O)$ wherein, M is $Cu^{2+}$, $Sn^{4+}$, or $Ni^{2+}$, X is $Cl^-$, $Br^-$, $I^-$, $SCN^-$, $SO_4^{2-}$, $NO_3^-$ or $C_2O_4^{2-}$, n is 1-4, m is 1-6, and M has a valence equal to the absolute value of the product of n and a valence of X;
mixing the first solution and the second solution, obtaining a third solution having a plurality of silver nanowires; and
performing a purification procedure on the third solution and obtaining the silver nanowires.

2. The method as claimed in claim 1, wherein the step of mixing the first solution and the second solution comprises:
heating the first solution to a specific temperature; and
subsequently mixing the first solution with the second solution.

3. The method as claimed in claim 2, wherein the specific temperature is between 100° C. and 180° C.

4. The method as claimed in claim 1, wherein the capping agent comprises polyvinyl alcohol, polyvinyl pyrrolidone, polyethylene glycol, polydimethyl siloxane, or polyvinyl butyral.

5. The method as claimed in claim 1, wherein the first alcohol solvent and the second alcohol solvent both have at least two hydroxyl groups.

6. The method as claimed in claim 5, wherein the first alcohol solvent and the second alcohol solvent independently comprise ethylene glycol, glycerol, glucose, diethylene glycol, tri-ethylene glycol, propylene glycol, butanediol, or dipropylene glycol.

7. The method as claimed in claim 1, wherein the silver salt comprises $AgNO_3$, or $AgCF_3COO$.

8. The method as claimed in claim 1, wherein the metal precursor comprises $SnCl_4$, $SnI_4$, $SnSCN_4$, $CuCl_2$, $CuI_2$, $CuSCN_2$, $CuSO_4$, $NiCl_2$, $NiI_2$, $NiSCN_2$, $NiSO_4$, $Cu(NO_3)_2$ or a hydrate of the aforementioned compound.

9. The method as claimed in claim 1, wherein M of the metal precursor has an absolute value of reduction potential between 0.1 and 0.7.

10. The method as claimed in claim 1, wherein the second solution comprises a silver-containing complex which is a reaction product of the silver salt and the metal precursor.

11. The method as claimed in claim 10, wherein the silver-containing complex has a solubility product constant (KSP) between $10^{-5}$ and $10^{-18}$.

12. The method as claimed in claim 10, wherein the silver-containing complex is AgCl, AgBr, AgI, AgSCN, $AgSO_4$, or $AgC_2O_4$.

13. The method as claimed in claim 10, wherein the molar ratio of the silver salt to the metal precursor is from 1:0.0001 to 1:0.1.

14. The method as claimed in claim 1, wherein the plurality of silver nanowires is produced in the third solution after a reaction time of mixing the first and second solutions, wherein the reaction time is 5-60 min.

15. The method as claimed in claim 1, wherein the second solution further comprises an alkali metal salt.

16. The method as claimed in claim 15, wherein the alkali metal salt comprises NaCl, NaSCN, KI, $Na_2(C_2O_4)$ or KBr.

17. A method for preparing silver nanowire, comprising:

providing a first solution, wherein the first solution comprises a capping agent dispersed in a first alcohol solvent;

providing a second solution, wherein the second solution comprises a silver salt and a metal precursor dispersed in a second alcohol solvent, wherein the metal precursor is $CuCl_2$, wherein the molar ratio of the silver salt to the metal precursor is from 1:0.0008 to 1:0.001, mixing the first solution and the second solution, obtaining a third solution having a plurality of silver nanowires; and performing a purification procedure on the third solution and obtaining the silver nanowires.

18. The method as claimed in claim 17, wherein the molar ratio of the capping agent to the silver salt is from 0.5:1 to 1.5:1.

* * * * *